(12) United States Patent
Jain et al.

(10) Patent No.: US 6,231,644 B1
(45) Date of Patent: May 15, 2001

(54) AIR SEPARATION USING MONOLITH ADSORBENT BED

(75) Inventors: Ravi Jain, Bridgewater; Alberto I. LaCava, Hasbrouck Heights; Apurva Maheshwary, Nutley; John Robert Ambriano, Monmouth Beach; Divyanshu R. Acharya, Bridgewater; Frank R. Fitch, Bedminster, all of NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/360,328

(22) Filed: Jul. 23, 1999

(51) Int. Cl.⁷ .................................................. B01D 53/47
(52) U.S. Cl. .................................. 95/96; 95/102; 95/130; 96/132; 96/154
(58) Field of Search ............................... 95/96–105, 113, 95/130; 96/125, 132, 153, 154

(56) References Cited

U.S. PATENT DOCUMENTS

| | | | |
|---|---|---|---|
| 3,817,232 | * 6/1974 | Nakajima et al. | 96/132 X |
| 4,012,206 | 3/1977 | Macriss et al. | 55/54 |
| 4,093,435 | * 6/1978 | Marron et al. | 96/125 |
| 4,758,253 | 7/1988 | Davidson et al. | 55/77 |
| 4,769,053 | * 9/1988 | Fischer, Jr. | 96/125 |
| 4,776,998 | 10/1988 | Davidson et al. | 264/40.7 |
| 5,082,473 | 1/1992 | Keefer | 55/25 |
| 5,300,138 | * 4/1994 | Fischer et al. | 96/125 |
| 5,387,564 | 2/1995 | Takeuchi et al. | 502/62 |
| 5,401,706 | * 3/1995 | Fischer | 96/125 X |
| 5,464,467 | 11/1995 | Fitch et al. | 95/98 |
| 5,505,769 | * 4/1996 | Dinnage et al. | 96/154 X |
| 5,580,369 | 12/1996 | Belding et al. | 96/125 |
| 5,580,370 | * 12/1996 | Kuma et al. | 96/125 X |
| 5,632,804 | * 5/1997 | Schartz | 96/132 X |
| 5,650,221 | 7/1997 | Belding et al. | 442/417 |
| 5,660,048 | 8/1997 | Belding et al. | 62/94 |
| 5,674,311 | * 10/1997 | Notaro et al. | 96/132 X |
| 5,685,897 | 11/1997 | Belding et al. | 96/154 |
| 5,733,451 | * 3/1998 | Coellner et al. | 96/125 X |
| 5,906,674 | 5/1999 | Tan et al. | 95/98 |
| 5,906,675 | 5/1999 | Jain et al. | 95/99 |

OTHER PUBLICATIONS

Y. Y. Li et al., Zeolite Monoliths For Air Separation, Part 1: Manufacture and Characterization, Trans IChemE., vol. 76, Part A, pp. 921–930, Nov. 1998.

Y.Y. Li et al., Zeolite Monoliths For Air Separation, Part 2: Oxygen Enrichment, Pressure Drop and Pressurization, Trans IChemE., vol. 76, Part A, pp. 931–941, Nov. 1998.

* cited by examiner

Primary Examiner—Robert H. Spitzer
(74) Attorney, Agent, or Firm—Philip H. Von Neida; Salvatore P. Pace

(57) ABSTRACT

A method of separating a first gaseous component from a gas mixture comprising the first gaseous component and a second gaseous component comprising passing the gaseous mixture into an adsorption zone containing an adsorbent material capable of preferentially adsorbing at least one of the gaseous components in the gaseous mixture, to separate the first gaseous component from the second gaseous component wherein the adsorbent material is a monolith having a plurality of channels throughout, the channels being aligned parallel to the direction of flow of the gaseous mixture and having a wall thickness of less than 1 mm and (b) recovering the non-preferentially adsorbed gaseous component from the adsorption zone. Preferably, the adsorption zone comprises multiple layers of monolithic structures in the shape of a wheel stacked one upon the other in a direction parallel to the direction of the flow of the gaseous mixture and form by spirally winding a sheet of corrugated adsorbable material about a hub.

19 Claims, No Drawings

AIR SEPARATION USING MONOLITH ADSORBENT BED

FIELD OF THE INVENTION

This invention relates to a process for separating the components of a gas stream, and more particularly to a cyclic adsorption process for separating oxygen from nitrogen. Specifically, the invention concerns a cyclic adsorption process, e.g. vacuum swing adsorption (VSA) or pressure swing adsorption (PSA), carried out in a system comprising at least one main adsorption vessel containing a monolith comprising an adsorbent material in the form of a wheel. In particular the adsorbent material comprises at least two layers of adsorbent material one of which is a monolith, preferably in the form of a spirally wound wheel.

BACKGROUND OF THE INVENTION

Cyclic adsorption processes are frequently used to separate the components of a gas mixture. Typically, cyclic adsorption processes are conducted in one or more adsorbent vessels that are packed with a particulate adsorbent material which adsorbs at least one gaseous component of the gas mixture more strongly than it adsorbs at least one other component of the mixture. The adsorption process comprises repeatedly performing a series of steps, the specific steps of the sequence depending upon the particular cyclic adsorption process being carried out.

In any cyclic adsorption process, the adsorbent bed has a finite capacity to adsorb a given gaseous component and, therefore, the adsorbent requires periodic regeneration to restore its adsorption capacity. The procedure followed for regenerating the adsorbent varies according to the process. In VSA processes, the adsorbent is at least partially regenerated by creating vacuum in the adsorption vessel, thereby causing adsorbed component to be desorbed from the adsorbent, whereas in PSA processes, the adsorbent is regenerated at atmospheric pressure. In both VSA and PSA processes, the adsorption step is carried out at a pressure higher than the desorption or regeneration pressure.

A typical VSA process generally comprises of a series of four basic steps that include (i) pressurization of the bed to the required pressure, (ii) production of the product gas at required purity, (iii) evacuation of the bed to a certain minimum pressure, and (iv) purging the bed with product gas under vacuum conditions. In addition a pressure equalization or bed balance step may also be present. This step basically minimizes vent losses and helps in improving process efficiency. The PSA process is similar but differs in that the bed is depressurized to atmospheric pressure and then purged with product gas at atmospheric pressure.

As mentioned above, the regeneration process includes a purge step during which a gas stream that is depleted in the component to be desorbed is passed countercurrently through the bed of adsorbent, thereby reducing the partial pressure of adsorbed component in the adsorption vessel which causes additional adsorbed component to be desorbed from the adsorbent. The nonadsorbed gas product may be used to purge the adsorbent beds since this gas is usually quite depleted in the adsorbed component of the feed gas mixture. It often requires a considerable quantity of purge gas to adequately regenerate the adsorbent. For example, it is not unusual to use half of the nonadsorbed product gas produced during the previous production step to restore the adsorbent to the desired extent. The purge gas requirement in both VSA and PSA processes are optimization parameters and depend on the specific design of the plant and within the purview of one having ordinary skill in the art of gas separation.

Many process improvements have been made to this simple cycle design in order to reduce power consumption, improve product recovery and purity, and increase product flowrate. These have included multi-bed processes, single-column rapid pressure swing adsorption and, more recently, piston-driven rapid pressure swing adsorption and radial flow rapid pressure swing adsorption. The trend toward shorter cycle times is driven by the desire to design more compact processes with lower capital costs and lower power requirements. The objective has been to develop an adsorbent configuration that demonstrates a low pressure drop, a fast pressurization time and an ability to produce the required purity of oxygen.

Most commercial adsorption processes currently employ fixed-bed adsorbents usually in the form of beads or pellets. Typically, these beads or pellets range in size from about 1 mm to 4 mm. In two recent articles by Y. Y. Li et al., in the Trans Ichem E, Vol 76, Part A (Nov. 1998), the authors have disclosed the use of extended zeolite monolith structure (20 mm diameter and 1 mm thickness) and their application to air separation and/or O2 enrichment. In addition, U.S. Pat. Nos. 4,758,253 and 5,082,473 are directed to the use of absorbents having a plurality of small passages for gas separation. The present invention is directed to an improved air separation process utilizing monolithic adsorbent material.

SUMMARY OF THE INVENTION

It is the primary object of the present invention to provide a process for the separation of components in a gas mixture.

It is another object of the present invention to provide a process for the separation of oxygen from nitrogen.

It is still another object of the present invention to provide a process for the separation of oxygen from nitrogen utilizing vacuum swing adsorption (VSA).

It is a further object of the present invention to provide a process for the separation of oxygen from nitrogen utilizing pressure swing adsorption (PSA).

Additional objects and advantages of the invention will be set forth in part in the description which follows and in part will be obvious from the description or will be learned by practice of the invention. The objects and advantages of the invention may be realized and attained by means of the instrumentalities and combinations particularly pointed out in the appended claims.

To achieve the foregoing objects, and in accordance with the purposes of the invention or embodied and broadly described herein, the process of the present invention comprises introducing a gaseous mixture comprising a first gaseous component and a second gaseous component into an adsorption zone containing at least two layers of adsorbent material capable of preferentially adsorbing at least one of the gaseous components in the gaseous mixture to separate the first gaseous component from the second gaseous component wherein the layers of adsorbent material are stacked in a direction parallel to the flow of the gaseous mixture through the adsorption zone and at least one of the adsorption layers is selected to be a monolith wheel having a plurality of channels throughout, the channels being aligned substantially parallel to the direction of the flow of the gaseous mixture through the adsorption zone and recovering the non-preferentially adsorbed gaseous component from the adsorption zone.

In another aspect of the present invention, and in accordance with the purposes of the invention or embodied and broadly described herein, the process of the present invention comprises introducing a gaseous mixture comprising a first gaseous component and a second gaseous component into an adsorption zone containing at least one adsorbent material capable of preferentially adsorbing at least one of the gaseous components in the gaseous mixture to separate the first gaseous component from the second gaseous component wherein the adsorbent material is selected to be a monolith wheel (non-rotating) comprising a spirally-wound sheet of adsorbent material having a plurality of channels throughout, the channels being aligned substantially parallel to the direction of the flow of the gaseous mixture through the adsorption zone and recovering the non-preferentially adsorbed gaseous component from the adsorption zone.

In still another aspect of the present invention, and in accordance with the purposes of the invention or embodied and broadly described herein, the process of the present invention comprises introducing a first gaseous component and a second gaseous component into an adsorption zone containing at least one layer of adsorbent material capable of preferentially adsorbing at least one of the gaseous components in the gaseous mixture to separate the first gaseous component from the second gaseous component wherein at least one adsorption layer is selected to be a monolith having a plurality of channels throughout, the channels being aligned substantially parallel to the direction of the flow of the gaseous mixture through the adsorption zone and having a wall thickness of below 1 mm and recovering the non-preferentially adsorbed gaseous component from the adsorption zone.

In a preferred embodiment of the present invention, the gaseous mixture comprises air and the first and second gaseous components are oxygen and nitrogen.

In a further preferred embodiment of the present invention, at least two of the adsorbent layers in the adsorbent zone are in the form of monolith wheels.

In a still further preferred embodiment of the present invention, all of the adsorbent layers in the adsorption zone comprise monolith wheels.

In another preferred embodiment of the present invention, the adsorption zone is selected to be an adsorption column.

In still another preferred embodiment of the present invention, the adsorbent layer in the form of the monolith wheel has a diameter substantially equal to the diameter of the adsorption column.

In a further preferred embodiment of the present invention, the spirally-wound sheet of adsorbent material forming the monolith comprises at least one corrugated layer.

In another preferred embodiment of the present invention, the walls of the monolith adsorbent layer are below 0.3 mm, especially preferred being 0.2 mm or less.

In a further preferred embodiment of the present invention, the spirally-wound sheet of adsorbent material forming the monolith comprises at least one corrugated layer attached to at least one flat sheet of adsorbent material.

In a still further preferred embodiment of the present invention, the spirally wound sheet of adsorbent material forming the monolith contains a void space in the center of the wheel wherein the non-adsorbed gaseous component of the gaseous mixture is removed from the adsorption zone Reference will now be made in detail to the description of the process of the present invention. While the process of the present invention will be described in connection with the preferred procedure, it will be understood that it is not intended to limit the invention to that specific procedure. On the contrary, it is intended to cover all alternatives, modifications and equivalents as may be included within the spirit and scope of the invention defined by the appended claims.

DETAILED DESCRIPTION OF THE INVENTION

The process of the present invention relates to employing monolithic adsorbent in conventional fixed-bed configurations for the separation of the gaseous components in air (e.g. oxygen and nitrogen)) to produce pure (e.g. 90% or greater, preferably, 93% or greater) oxygen. The monolithic adsorbent is preferably in the form of a wheel having a height of between 4 to 12 inches, preferably 6 to 10 inches, especially preferred being 8 to 10 inches, and a diameter of typically 8 to 12 feet, preferably the diameter of the monolithic wheel is substantially identical to the diameter of the adsorption vessel (e.g. column). In the process of the present invention, the gaseous mixture (e.g. air) is passed through a conventional fixed-bed vertical adsorption vessel having the monolithic adsorbent wheels which may comprise either the same or different adsorbent material stacked vertically one on the other to the required height (e.g. 6 to 8 feet) for air separation by either VSA or PSA processes.

In accordance with the practice of the present invention, the monolith adsorbent wheels will be fabricated by methods known to those of ordinary skills in the art. For example, in one embodiment the sheet material is fabricated by providing alternating layers of flat and corrugated adsorbent materials. It is, however, important that the thickness of the sheet or web of adsorbent material be maintained below 1 mm, preferably below about 0.3 mm, especially preferred being 0.2 mm in order to achieve the high performance of the process of the present invention. Typically, the monolith may be formed by winding a sheet or web of corrugated adsorbent paper about a hub until a multilayered adsorbent monolith layer is built up to the desired diameter and configuration (preferably substantially the same as the diameter and configuration of the adsorption vessel). In another embodiment of the present invention, the monolith is formed by winding a sheet or web of corrugated adsorbent paper having at least one flat sheet of adsorbent material bonded to at least one side. For more detail as to the manufacture of monoliths used in the practice of the process of the present invention, reference is made to U.S. Pat. Nos. 5,660,048, 5,650,221, 5,685,897, 5,580,367 and 4,012,206 herein incorporated by reference.

Preferably, the monolith wheel comprising the adsorbent material is adapted to have the same configuration as the adsorption vessel, for example, in the case of a circular column the monolith will be in the form of a wheel. The diameter of monolith wheel and the adsorption vessel inside diameter should be chosen in such a way that adequate seal is maintained between the vessel wall and monolith. This is important to avoid any channeling which may cause separation process under-performance. If the monolith cannot be conformed to the geometry of the adsorption vessel then an outer casing can be placed about the perimeter of the monolith and the monolith can be secured at the bottom and top of the inside surface of the adsorption vessel to ensure that gas does not pass through the adsorption vessel without proper contact with the adsorbent. Typically, this outer casing comprises any non-adsorbent material preferably a non-porous material such as Fiberfrax (supplied by The Carborundum Corporation). In addition, it should be understood that the process of the present invention is applicable to VSA and PSA radial flow gas separation process.

In addition, the monolith wheel once removed from the hub will have a void in the center of the wheel. It is envisioned that this void center can be utilized as the outlet port for the non adsorbed gas (product gas). However if the void is not utilized as the outlet port for the product gas then the void should be plugged with non-porous material similar to that used for the casing.

Typically, any adsorbent material may be utilized in the practice of the present invention. For example, Type X and A zeolites, silica gel, carbon molecular sieve and activated alumina are suitable in the practice of the present invention. The conditions for operation of the adsorption process are conventional and do not form a part of the invention. Typical operating conditions for VSA are feed pressure of 1013 millibar or higher and a vacuum pressure of 260 millibar or higher with a partial cycle time of between about 10 to 60 seconds. Typical operating conditions for PSA are feed pressure of up to 3.00 bara with a cycle time of between about 10 to 60 seconds.

In a preferred embodiment of the present invention, the PSA bed or VSA bed will be configured in vertical orientation (a geometry most suitable for monoliths) with the layers of adsorbent materials stacked one on top of the other. In this configuration, the first layer of monolith may be alumina based for moisture removal with the subsequent monoliths comprising a zeolite sieve (e.g. LiX or NaX ).

It may be attractive to modify the above configuration to include a high thermal conductivity material within the adsorbent layer of the monolith to help alleviate "cold spots" from the adsorption bed. For example, a small amount (e.g 1 to 2% by weight) of a high thermal conductivity material such as stainless steel powder may be incorporated in the adsorbent sheet during manufacture. Alternately, a porous thin sheet of stainless steel mesh may be utilized as a substrate onto which one coats or impregnates the adsorbent material during formation of the monolith structure. It is envisioned that a small amount of thermally conductive powder will allow for faster heat transfer through the adsorbent thereby diminishing the problems which occur due to the formation of cold spots in the bottom of the adsorption vessel.

An additional optimization parameter which must be considered in monolith optimization is the cell density which is defined as the number of open channels per square inch of monolith area. Higher cell density effectively reduces monolith open area and enables increased adsorbent loading. However, higher density would also increase pressure drop. It is envisioned during the practice of the present invention that one would layer monoliths with different cell density in the bed to maximize the advantage of performance while minimizing pressure drop.

Typically, the monolith manufacturing process includes processing with water which means that the resulting monolith adsorbent will retain a relatively high amount of residual moisture. This residual moisture, of course, is not desirable for gas separation process. Accordingly, in a preferred embodiment of the present invention the monolith is heat treated (calcined) at an elevated temperature (e.g. 375° to 425° C., preferably 400° C.) in the presence of dry nitrogen after it has been positioned in the adsorption vessel to remove any residual moisture from the monolith. It should be understood that if heating to a high temperature is not possible due to the nature of the binder (e.g. polymeric) used in the process of manufacturing the monolith sheet/layer, a vacuum may be applied to lower the calcination temperature and still effectively remove the residual moisture. Once the calcination has taken place the adsorption vessel is then sealed so that no air/moisture ingress can occur prior to introduction of the gaseous mixture into the adsorption zone.

It is understood that there are significant advantages of the process of the present invention. The use of a monolith structure according to the process of the present invention results in a substantially lower bed pressure drop than that observed with the use of conventional forms of adsorbents (e.g. beads). In addition, the use of a monolith structure eliminates any concerns regarding fluidization of the adsorbent bed when operating at high flow rates.

The following simulated example is set forth below for illustrative purposes only. The monolith was assumed to be constructed of adsorbent material blended with a binder and with supporting fibers (a total of about 25% of the mass) and formed in a similar form as "corrugated cardboard". The physical properties of the monolith bed may be found in various publications. For example, adsorbents suitable in the practice of the present invention are described in U.S. Pat. No. 5, 464,467 assigned to The BOC Group Inc. assignees of the instant application.

EXAMPLE I

A vertical bed of 12 feet in diameter and 2 meters in height was used in the simulation. The monolith absorbent structure had a wall thickness of 0.25 mm with about 74% open areas. The simulation results are reported in the following table:

| Plant | Cycle Time Sec | Capacity Metric Tons/Day | Specific Product $Nm^3/m^3/hr$ | Yield % | Specific Power $kW/nm^3$ |
|---|---|---|---|---|---|
| Conventional Adsorbent Beads | 90 | 31 | 31 | 56 | 0.29 |
| Monolith Plant | 35 | 118 | 84 | 68 | 0.28 |

Which the invention has been described in conjunction with specific embodiment thereof, it should be understood that many alternatives, modification, and variations will be apperent to those skilled in the art in light of the foregoing description. Accordingly, it is intended to embrace all such alternatives, modifications, and variations as fall within the spirit and broad scope of the appended claims.

We claim:

1. A method of separating a first gaseous component from a gas mixture comprising the first gaseous component and a second gaseous component comprising:

(a) passing the gaseous mixture into an adsorption zone containing at least two layers of adsorbent material capable of preferentially adsorbing at least one of the gaseous components in the gaseous mixture, to separate the first gaseous component from the second gaseous component wherein the layers of adsorbent material are positioned, stacked parallel to the direction of the flow of the gaseous mixture through the adsorption zone and at least one of the adsorption layers is a monolithic wheel having a plurality of channels throughout said channels being aligned parallel to the direction of flow of the gaseous mixture; and (b) recovering the non-preferentially adsorbed gaseous component from the adsorption zone.

2. The process of claim 1 wherein the gaseous mixture comprises air and the first and second gaseous components are oxygen and nitrogen.

3. The process of claim 1 wherein two of said at least one adsorption layers in the adsorbent zone are monolith wheels.

4. The process of claim 1 wherein all of the adsorption layers in the adsorption zone comprise monolith wheels.

5. The process of claim 1 wherein said monolithic wheel comprises a spirally wound corrugated sheet of adsorbent material.

6. The process of claim 5 wherein the spirally-wound sheet of adsorbent material forming the monolith comprises at least one corrugated layer.

7. The process of claim 1 wherein the adsorbent layer in the form of the monolith wheel has a diameter substantially equal to the diameter of the adsorption zone.

8. The process of claim 1 further comprising calcining the adsorbent monolith layer to remove substantially all the water from the monolith layer and sealing the adsorption zone after calcination until prior to introducing the gaseous mixture into the adsorption zone.

9. A process of separating a first gaseous component from a gaseous mixture comprising the first gaseous component and a second gaseous component comprising: introducing a gaseous mixture comprising a first gaseous component and a second gaseous component into a fixed bed adsorption zone containing at least two layers of adsorbent material capable of preferentially adsorbing at least one of the gaseous components in the gaseous mixture to separate the first gaseous component from the second gaseous component wherein the adsorbent material is selected to be a monolith wheel comprising a spirally-wound sheet of adsorbent material having a plurality of channels throughout, the channels being aligned substantially parallel to the direction of the flow of the gaseous mixture through the adsorption zone and recovering the non-preferentially adsorbed gaseous component from the adsorption zone.

10. The process of claim 9 wherein the gaseous mixture comprises air and the first and second gaseous components are oxygen and nitrogen.

11. The process of claim 9 wherein the adsorption zone is selected to be an adsorption column wherein the diameter of the column is less than the height.

12. The process of claim 11 wherein the adsorbent layer in the form of the monolith wheel has a diameter substantially equal to the diameter of the adsorption column.

13. The process of claim 9 wherein the spirally-wound sheet of adsorbent material forming the monolith comprises at least one corrugated layer.

14. The process of claim 9 wherein the non-adsorbed gaseous component of the gaseous mixture is removed from the adsorption zone via a void space provided in the center of the spirally wound monolith adsorbent layer.

15. The process of claim 9 further comprising calcining the adsorbent monolith layer to remove substantially all the water from the monolith layer and sealing the adsorption zone after calcination until prior to introducing the gaseous mixture into the adsorption zone.

16. A process of separating a first gaseous component from a gas mixture comprising subjecting said gas mixture to an adsorption process comprising the steps: introducing a gas mixture comprising a first gaseous component and a second gaseous component into a fixed bed adsorption zone containing one layer of adsorbent material capable of preferentially adsorbing at least one of the gaseous components in the gas mixture to separate the first gaseous component from the second gaseous component wherein said one adsorption layer is selected to be a monolith having a plurality of channels throughout, the channels being aligned substantially parallel to the direction of the flow of the gas mixture through the adsorption zone and having a wall thickness of below 1 mm and recovering the non-preferentially adsorbed gaseous component from the adsorption zone.

17. The process of claim 16 wherein the walls of the monolith adsorbent layer are below 0.3 mm.

18. The process of claim 17 wherein the walls of the monolith adsorbent layer are 0.2 mm or less.

19. The process of claim 16 further comprising calcining the adsorbent monolith layer to remove substantially all the water from the monolith layer and sealing the adsorption zone after calcination until prior to introducing the gaseous mixture into the adsorption zone.

* * * * *